United States Patent
Ha et al.

(10) Patent No.: US 11,585,316 B1
(45) Date of Patent: Feb. 21, 2023

(54) RENEWABLE ENERGY GENERATION DEVICE AND CONTROL METHOD THEREFOR

(71) Applicants: HYUNDAI MOTOR COMPANY, Seoul (KR); Kia Corporation, Seoul (KR)

(72) Inventors: Dong Hyun Ha, Seoul (KR); Jung Hun Choi, Hwaseong-si (KR); Jae Wung Jung, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/899,990

(22) Filed: Aug. 31, 2022

(30) Foreign Application Priority Data

Dec. 22, 2021 (KR) .................. 10-2021-0185165

(51) Int. Cl.
    *F03B 13/18* (2006.01)
    *F03B 13/14* (2006.01)

(52) U.S. Cl.
    CPC ........ *F03B 13/1805* (2013.01); *F03B 13/145* (2013.01); *F03B 13/181* (2013.01);
    (Continued)

(58) Field of Classification Search
    CPC ...... F03B 13/14; F03B 13/145; F03B 13/147; F03B 13/1805; F03B 13/181;
    (Continued)

(56) References Cited

U.S. PATENT DOCUMENTS 2,089,064 A * 8/1937 Loftis .................. F03B 13/20
    417/331
3,011,062 A * 11/1961 Goldsmith ............ F03B 13/26
    60/498
(Continued)

FOREIGN PATENT DOCUMENTS

CN     107651143 A * 2/2018 ............ B63C 11/52
CN     108999740 A * 12/2018
(Continued)

OTHER PUBLICATIONS

English translations (or English abstracts) of the foreign references.*

*Primary Examiner* — Mickey H France
(74) *Attorney, Agent, or Firm* — Morgan, Lewis & Bockius LLP

(57) ABSTRACT

The present disclosure provides a renewable energy generator including a housing formed to float in a body of water, a main generator unit, frame(s) fixed internally of the housing at intervals, a main rotating shaft for linking the main generator unit rotatably to the frame(s), and a controller for operating the pendulum by driving the main motor, and controlling the main generator unit to cause the housing to behave due to the pendulum operation. The main generator unit includes an inner housing, a pendulum moving inside the inner housing, a pendulum rotation shaft vertically connected to the pendulum and fixed to the inner housing, a main motor for converting kinetic energy of the pendulum into electrical energy, and a gear unit linked to the pendulum rotation shaft and transmitting the kinetic energy of the pendulum to the main motor.

20 Claims, 8 Drawing Sheets

(52) U.S. Cl.
CPC .......... *F03B 13/182* (2013.01); *F03B 13/147* (2013.01); *F05B 2240/93* (2013.01); *F05B 2260/5032* (2013.01); *F05B 2270/20* (2013.01)

(58) Field of Classification Search
CPC ............... F03B 13/182; F05B 2270/20; F05B 2260/5032; F05B 2240/93
USPC ......... 60/497, 498, 499, 500, 501, 502, 503, 60/505, 506, 507; 290/42, 53
See application file for complete search history.

(56) References Cited

U.S. PATENT DOCUMENTS

| | | | | |
|---|---|---|---|---|
| 3,696,251 | A * | 10/1972 | Last | H02K 35/00 310/15 |
| 3,861,487 | A * | 1/1975 | Gill | B60K 25/10 180/2.2 |
| 3,912,938 | A * | 10/1975 | Filipenco | F03B 13/183 417/330 |
| 4,168,556 | A * | 9/1979 | Fink | B63B 1/047 114/264 |
| 4,317,047 | A * | 2/1982 | de Almada | F03B 13/141 416/86 |
| 4,438,343 | A * | 3/1984 | Marken | F03B 13/20 60/507 |
| 4,580,400 | A * | 4/1986 | Watabe | F03B 13/182 417/330 |
| 5,048,356 | A * | 9/1991 | Levko | F03B 17/00 74/86 |
| 7,453,165 | B2 * | 11/2008 | Hench | F03B 13/20 290/53 |
| 8,476,778 | B2 * | 7/2013 | Weinberger | F03G 5/00 290/42 |
| 9,570,969 | B1 * | 2/2017 | Bristow, Jr. | H02K 21/00 |
| 2007/0228736 | A1 * | 10/2007 | Smushkovich | F03B 15/00 290/42 |
| 2008/0093858 | A1 * | 4/2008 | Hench | F03B 13/20 290/53 |
| 2009/0051168 | A1 * | 2/2009 | Fujisato | F03B 13/1815 290/53 |
| 2009/0160191 | A1 * | 6/2009 | Beane | F03B 13/20 290/53 |
| 2009/0313988 | A1 * | 12/2009 | Cassagnol | F03B 13/20 60/497 |
| 2010/0123313 | A1 * | 5/2010 | Hobdy | F03G 7/08 290/42 |
| 2010/0181772 | A1 * | 7/2010 | Ozturk | F03G 7/08 91/418 |
| 2010/0264657 | A1 * | 10/2010 | Catinella | F03B 13/182 290/53 |
| 2010/0319340 | A1 * | 12/2010 | Wickett | F16H 31/001 74/731.1 |
| 2011/0187101 | A1 * | 8/2011 | Beane | F03B 13/00 290/53 |
| 2011/0291418 | A1 * | 12/2011 | Ono | F03B 13/20 290/53 |
| 2012/0139262 | A1 * | 6/2012 | Begley | F03G 7/08 290/1 R |
| 2014/0084586 | A1 * | 3/2014 | Henwood | F03B 13/20 290/42 |
| 2017/0175701 | A1 * | 6/2017 | Barrett | F03B 13/182 |
| 2017/0335935 | A1 * | 11/2017 | Sathyanarayanan | F03B 13/14 |
| 2018/0372061 | A1 * | 12/2018 | Vamvas | F03B 13/20 |
| 2020/0347817 | A1 * | 11/2020 | Lee | H02K 5/10 |
| 2022/0161905 | A1 * | 5/2022 | Kim | B63B 35/44 |

FOREIGN PATENT DOCUMENTS

| | | | | |
|---|---|---|---|---|
| CN | 111396237 A | * | 7/2020 | |
| CN | 111997817 A | * | 11/2020 | ............ F03B 13/14 |
| EP | 2400146 A2 | * | 12/2011 | ............ F03B 13/20 |
| FR | 2992030 A1 | * | 12/2013 | ............ F03B 13/181 |
| WO | WO-2007121380 A2 | * | 10/2007 | ............ H02K 35/02 |

* cited by examiner

RENEWABLE ENERGY GENERATION DEVICE AND CONTROL METHOD THEREFOR

CROSS-REFERENCE TO RELATED APPLICATIONS

This application is based on, and claims priority from, Korean Patent Application Number 10-2021-0185165, filed Dec. 22, 2021, the disclosure of which is incorporated by reference herein in its entirety.

TECHNICAL FIELD

The present disclosure in some embodiments relates to a renewable energy generator and a control method therefor.

BACKGROUND

The statements in this section merely provide background information related to the present disclosure and do not necessarily constitute prior art.

To produce electricity, various methods exist and are widely used, including thermal power generation using chemical energy of fossil fuels, hydroelectric power generation using the potential energy of water by forming dams, and nuclear power generation using nuclear fission of uranium.

However, in recent years, resource depletion, safety issues, and eco-friendly values are increasingly propelling renewable energy productions in proportion over the three major power generation sources. Renewable energy includes power generation using infinite energy sources such as solar power, solar heat, tidal power, wave power, wind power, and geothermal heat.

More than 70% of the earth's surface is the sea that borders different countries with large bodies of water making them good environmental candidates to take advantage of the infinite energy of the waters, which garners increasing interest in wave power generation. Wave power generation refers to the production of electrical energy by using the periodic vertical motion of the water surface caused by waves.

Conventional wave power generation device is difficult to stably produce power by providing irregular horizontal and vertical motions in accord with the movement of irregular waves. For example, the conventional device cannot produce electricity efficiently because it is difficult to stably generate electricity in response to the fluidic movements of the sea level.

Moreover, since the position and attitude of the conventional wave power device fluctuate by naturally floating in a body of water or the sea, the wave power device when in a bad position and posture cannot produce electricity efficiently.

SUMMARY

According to at least one embodiment, the present disclosure provides a renewable energy generator including a housing configured to float in a body of water, a main generator unit, one or more frames fixed internally of the housing at predetermined intervals, a main rotating shaft configured to link the main generator unit to be rotatable with respect to the one or more frames, and a controller. The main generator unit includes an inner housing, a pendulum configured to move inside the inner housing, a pendulum rotation shaft vertically connected to the pendulum and fixed to the inner housing, a main motor configured to convert kinetic energy of the pendulum into electrical energy, and a gear unit linked to the pendulum rotation shaft and configured to transmit the kinetic energy of the pendulum to the main motor. The controller is configured to operate the pendulum by driving the main motor, and to control the main generator unit to render the housing to behave due to an operation of the pendulum.

According to at least one embodiment, the present disclosure provides a method of generating renewable energy including the steps (not necessarily in the following order) of (i) calculating a position and an attitude of a renewable energy generator shaped as a self-righting roly-poly toy or capsule configured to convert wave energy into electrical energy to produce electric power, (ii) determining whether or not a pendulum needs to operate internally of the renewable energy generator, (iii) upon determining that the pendulum needs to operate, converting a main motor and an auxiliary motor installed internally of the renewable energy generator to a driving mode, and (iv) adjusting a tilt of the renewable energy generator.

According to at least one embodiment, the present disclosure provides a renewable energy generator including a housing configured to float in a body of water, a main generator. The main generator includes an inner housing, a pendulum rotation shaft mechanically coupled to the inner housing, a pendulum configured to swing around an axis of the pendulum rotation shaft to cause the pendulum rotation shaft to rotate, a main motor, a gear linked to the pendulum rotation shaft and configured to transmit rotation of the pendulum rotation shaft to the main motor to cause the main motor to generate electrical energy, and one or more frames fixed internally of the housing. The renewable energy generator further includes a main rotating shaft configured to link the main generator to be rotatable with respect to the one or more frames, and a controller configured to control rotation of the main rotating shaft to cause the main generator to move, so as to adjust a tilt of the housing with respect to the water.

DETAILED DESCRIPTION

Figure 1:
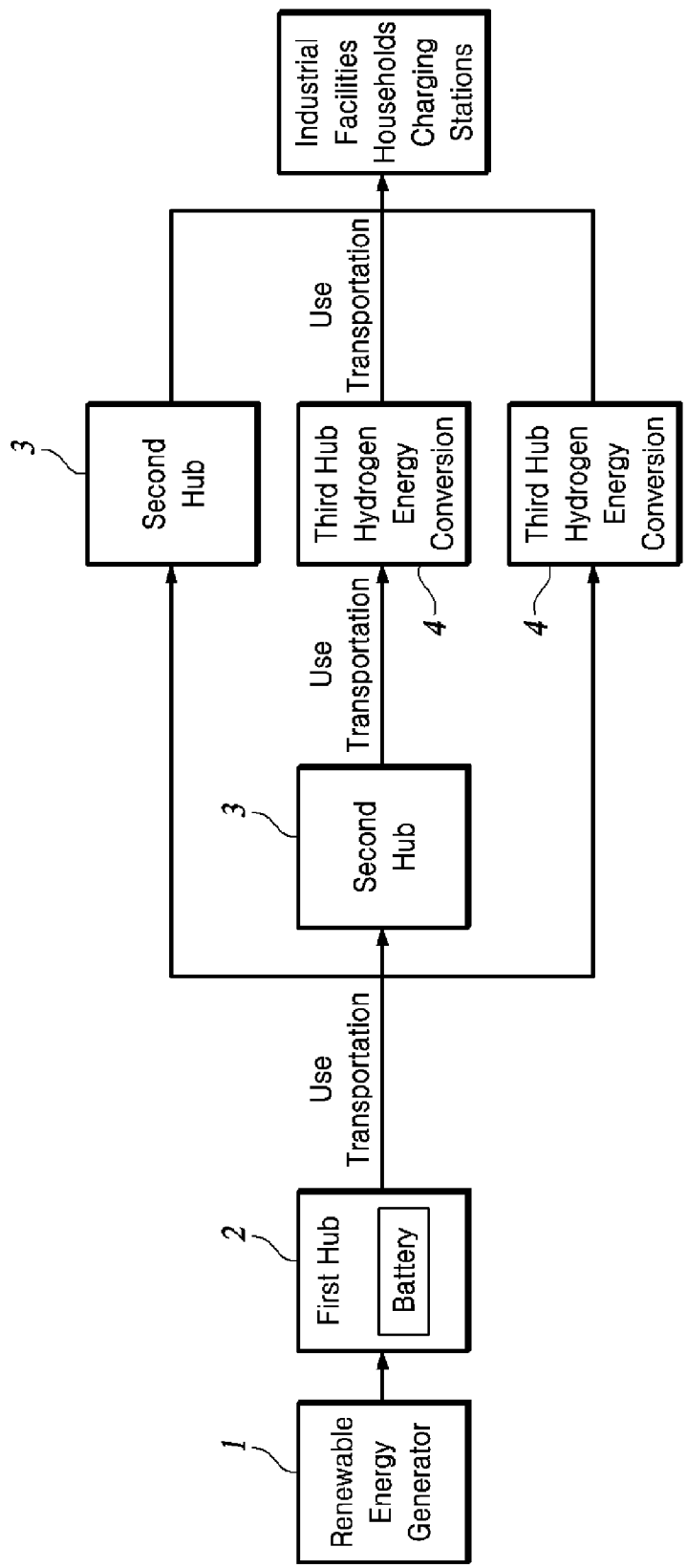
FIG. 1 is a block diagram of a renewable energy generation system using a renewable energy generator according to at least one embodiment of the present disclosure.

The present disclosure in at least one embodiment seeks to provide a renewable energy generator that can generate electric power effectively with a pendulum operation and motors controlled by taking into account the intensity, speed, and frequency of the waves.

The renewable energy generator according to at least one embodiment can adjust the tilt of the renewable energy generator by controlling the operation of the pendulum and the motor.

The issues to be solved by the present disclosure are not limited to those mentioned above, and other unmentioned issues to be solved will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a block diagram of a renewable energy generation system using a renewable energy generator 1 according to at least one embodiment of the present disclosure.

As shown in FIG. 1, the renewable energy generation system may include the renewable energy generator 1, a first hub 2, second hubs 3, third hubs 4, transportation, and a battery in whole or in part.

Multiples of the renewable energy generator 1 may be interconnected by using a cable, and they may float in the coastal waters and distant seas. The multiple renewable energy generators 1 may each be shaped as a roly-poly toy or capsule. The multiple renewable energy generators 1 may each convert wave energy into electrical energy to produce electric power.

The renewable energy generator 1 may have its surface installed with solar panels. The solar panels may be installed on the top of the surface of the renewable energy generator 1, for example, the part that is not submerged in seawater. The renewable energy generator 1 can not only convert wave energy into electrical energy but also convert solar energy into electrical energy by using solar panels.

The first hub 2 may be positioned to be surrounded by multiple renewable energy generators 1. The first hub 2 may be cabled to the multiple renewable energy generators 1 (e.g., the first hub 2 may be connected to the multiple renewable energy generators 1 through cables) and may receive electrical energy therefrom through, for example, the cables. The first hub 2 may receive and store electrical energy from the renewable energy generators 1. The electrical energy transferred to the first hub 2 may charge a battery and transportation coupled to the first hub 2. In this case, the transportation may include using an unmanned aerial vehicle (UAV), an unmanned ship, a drone, or the like.

The second hubs 3 may each be positioned to be surrounded by a plurality of first clusters including the first hub 2. The third hubs 4 may each be positioned to be surrounded by a plurality of second clusters including the second hub 3.

The transportation may deliver battery and electrical energy between the first hub 2, the second hubs 3, and the third hubs 4 to each other. Additionally, the transportation may deliver the battery and electrical energy to the first hub 2, the second hubs 3, the third hubs 4, and a separate place located on the ground. Here, the separate place may be present and future mobility means such as an electric vehicle (EV), purpose-built vehicle (PBV), urban air mobility (UAM), robot, their electric charging stations, households, industrial facilities, etc. For example, with Vehicle To Grid (V2G) technology, a rechargeable eco-friendly vehicle may be linked to a power grid to use surplus power as provided by the present disclosure. The eco-friendly vehicle may work as a moving energy storage system (ESS) by using the power grid to first charge the vehicle and feed the remaining electricity back to the power grid after the vehicle operation.

The renewable energy generation system can convert electrical energy into hydrogen energy and transport the converted hydrogen energy. When energy is stored in the first hub 2 to the third hubs 3 for a long time, a large amount of energy (1 TWh or more) may be stored. For large-capacity energy storage, hydrogen energy is a more suitable form of energy than electrical energy. Additionally, since hydrogen energy loses less than electrical energy during long-distance transport, hydrogen energy is particularly suitable for international transport of energy.

Figure 2:
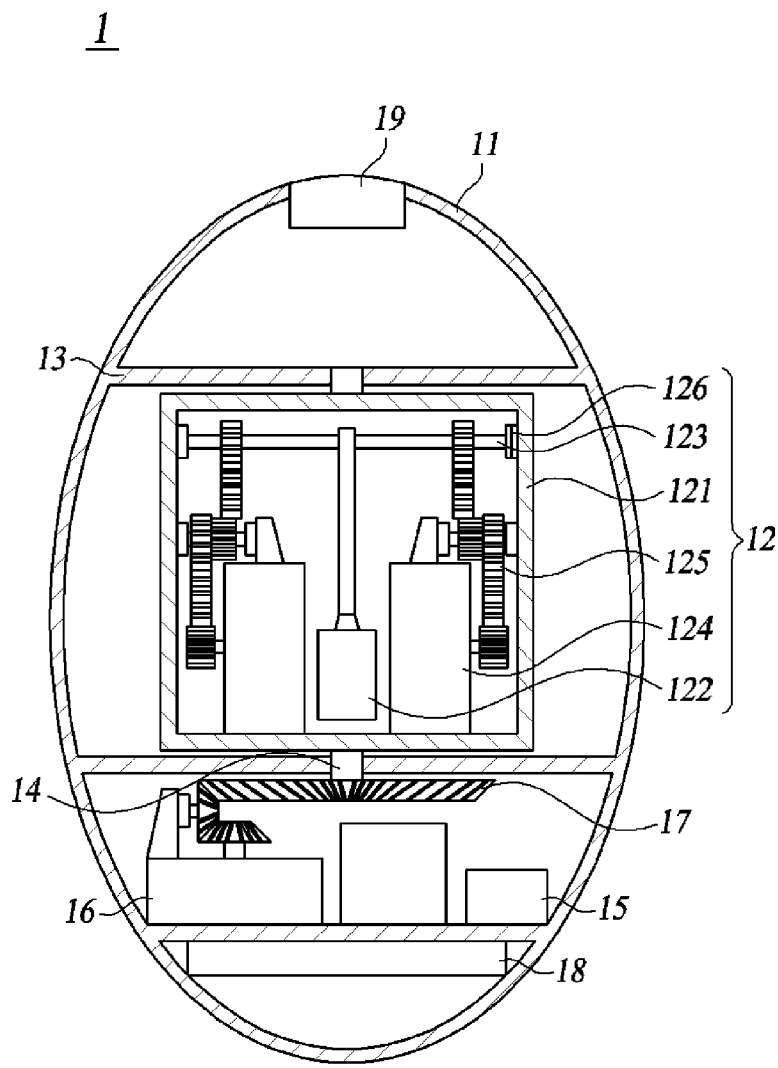
FIG. 2 is a cross-sectional view of a renewable energy generator according to an embodiment of the present disclosure.

FIG. 2 is a cross-sectional view of the renewable energy generator 1 according to at least one embodiment of the present disclosure.

As shown in FIG. 2, the renewable energy generator 1 may include a housing 11, a main generator unit 12, a frame 13, a main rotating shaft 14, a controller 15, an auxiliary motor 16, and an auxiliary gear unit 17 in whole or in part.

The housing 11 may be in the shape of a roly-poly toy or capsule to be able to float in the coastal waters and distant seas. A solar panel may be installed on the surface of the housing 11. The housing 11 may have its surface installed with solar panels. The solar panels may be installed on the top of the surface of the housing 11, for example, the part that is not submerged in seawater. The housing 11 may have its upper end installed with a communication module 19. The communication module 19 may be an Ultra Wide Band-based (UWB-based) module for calculating the absolute coordinates (x, y, z) of the renewable energy generator 1. For example, the communication module 19 may monitor the tilted state of the renewable energy generator 1 and calculate the tilt angle to control the behavior of the renewable energy generator 1.

The main generator unit 12 includes an inner housing 121, a pendulum 122, a pendulum rotating shaft 123, main motors 124, gear units 125, and a rotating angle sensor 126 in whole or in part.

The main generator unit 12 may generate electric power by converting wave energy into electrical energy by using the movement of the pendulum 122. The pendulum 122 inside the main generator unit 12 moves in accord with the movement of the waves, and the kinetic energy of the pendulum 122 is converted into electrical energy. The motion of the pendulum 122 may be transmitted to the main motors 124 via the pendulum rotation shaft 123 and the gear units 125. The main motors 124 may generate and store electrical energy in the battery 18. The main motors 124 may operate in an electricity generation mode for generating electrical energy.

The movement of the pendulum 122 in accord with the changes in the waves may cause a moment of rotational inertia in the main generator unit 12. When the main generator unit 12 rotates due to the moment of rotational inertia, the rotation of the main generator unit 12 may be transmitted to the auxiliary motor 16 via the main rotating shaft 14 and the auxiliary gear unit 17. The main rotating shaft 14 may connect the main generator unit 12 rotatably to the frame 13 that is affixed to the housing 11. The auxiliary motor 16 may additionally produce electrical energy and store the electrical energy profit in the battery 18. At this time, the auxiliary motor 16 may operate in an electricity generation mode for producing electrical energy.

Figure 3:
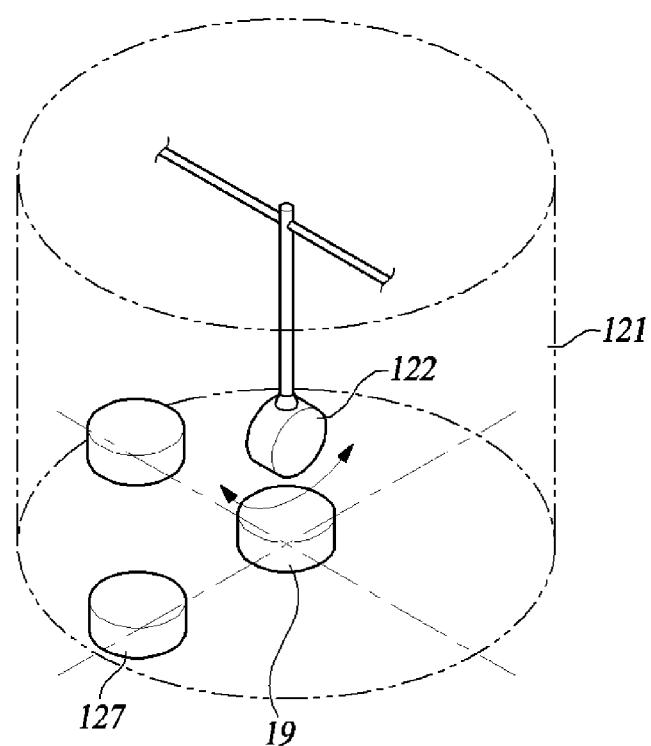
FIG. 3 is a schematic diagram showing the inside of a main generator unit of a renewable energy generator according to at least one embodiment of the present disclosure.

FIG. 3 is a schematic diagram showing the inside of a main generator unit 12 of the renewable energy generator 1 according to at least one embodiment of the present disclosure.

As shown in FIG. 3, the main generator unit 12 may further include one or more gyro sensors 127 and a communication module 19.

The gyro sensor 127 refers to a sensor that measures a change in the orientation of an object by using the property of constantly maintaining its initially set direction, regardless of the rotation of the earth. The gyro sensor 127 may be used to calculate the intensity of the wave. For example, the intensity, frequency, speed, and pattern of the wave may be calculated by using the gyro sensor 127. FIG. 3 illustrates that the gyro sensors 127 are located inside the main generator unit 12, although they may be located outside the main generator unit 12, and there may be additional gyro sensors 127 or some of them may be deleted as necessary.

The present disclosure may use the communication module 19 to calculate the positioning information of the renewable energy generator 1. The UWB-based communication module 19 may be used to calculate the absolute coordinates of the renewable energy generator 1. For example, the present disclosure may monitor the tilt state of the renewable energy generator 1 and calculate the tilted angle to control the behavior of the renewable energy generator 1. FIG. 3 illustrates that the communication module 19 is located centrally of the bottom of the main generator unit 12, although the location of the communication module 19 is not limited thereto, and it may be located outside the main generator unit 12.

Figure 4A:
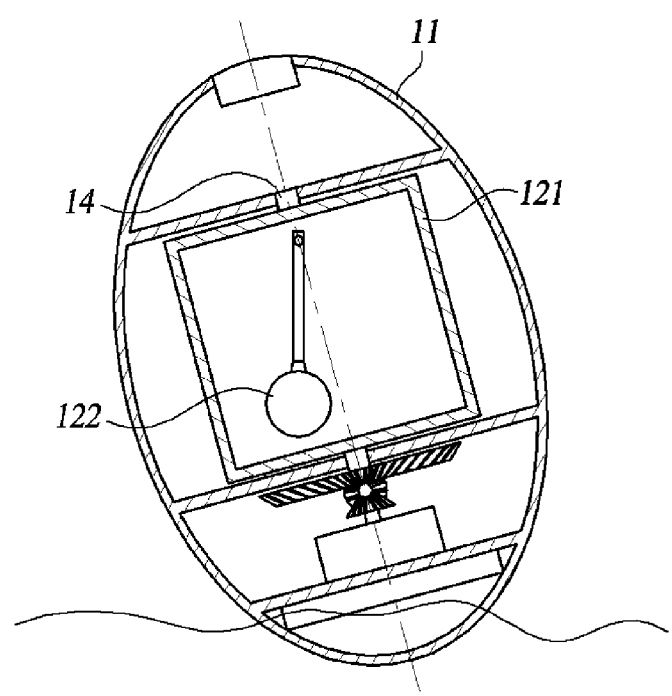
FIG. 4A and FIG. 4B illustrate a change in the tilt of a renewable energy generator that utilizes the operation of a pendulum according to at least one embodiment of the present disclosure.
Figure 4B:
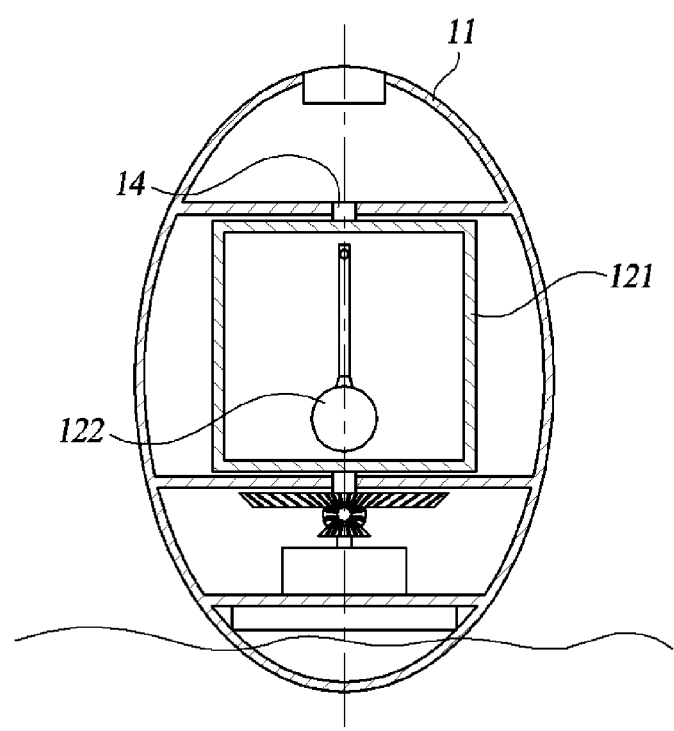

FIG. 4A and FIG. 4B are a diagram showing a change in the tilt of the renewable energy generator 1 that utilizes the operation of a pendulum according to at least one embodiment of the present disclosure.

As shown in FIG. 4A and FIG. 4B, the renewable energy generator 1 of the present disclosure can adjust the tilt of the housing 11. FIG. 4A shows a state in which the housing 11 is tilted to sea level. The main rotating shaft 14 of the renewable energy generator 1 may not be perpendicular to the sea level and it may be tilted at a predetermined angle. For example, the housing 11 may be tilted due to waves, and even in the absence of waves, the housing 11 may be tilted by various weather conditions. FIG. 4B shows a state in which the housing 11 is perpendicular to the sea level. In particular, the main rotating shaft 14 of the renewable energy generator 1 is perpendicular to the sea level.

Since the movement of the pendulum 122 is made in only one direction, the housing 11 when tilted may make it difficult to steadily produce electric power. Conventionally, a wave power device when in a bad position and posture would find it unable to produce electricity efficiently.

The controller 15 of the renewable energy generator 1 according to a least one embodiment may take into account the tilt of the housing 11 to control the renewable energy generator 1. For example, when the housing 11 is tilted, the controller 15 may control the housing 11 to a required tilt or demand tilt to increase the electricity generation efficiency of the renewable energy generator 1. Here, the demand tilt refers to the tilt of the housing 11 to the sea level, which is at a high electricity generation efficiency of the renewable energy generator 1. For example, the demand tilt may be a tilt when the housing 11 is perpendicular to the sea level.

The present disclosure can calculate the absolute coordinates of the renewable energy generator 1 by using the UWB-based communication module 19, the rotation angle sensor 126, and the gyro sensor 127, and it can calculate the current tilt and a demand tilt of the housing 11. Here, the current tilt refers to the inclination of the housing 11 in the current state of the renewable energy generator 1 against the sea level. Additionally, the demand tilt may be arbitrarily set by the operator. The demand tilt is not limited to the tilt when the housing 11 is perpendicular to the sea level, and it may be set to different values or calculated in various ways according to the electricity generation efficiency of the renewable energy generator 1 and the intensity of the waves.

The present disclosure can arbitrarily adjust the tilt of the housing 11 by using the behavior of the renewable energy generator 1. Additionally, the present disclosure can generate a predetermined motion by causing the renewable energy generator 1 to perform a cyclic or repeated behavior. The renewable energy generator 1 may generate a motion for observers to recognize the renewable energy generator 1. Observers such as drones, unmanned aerial vehicles, managers, and control centers can recognize the renewable energy generator 1 by using camera images, visual and measurement equipment, etc. The motion of the renewable energy generator 1 may be generated as needed regardless of the presence or absence or intensity of waves.

To arbitrarily adjust the tilt of the housing 11 or to generate a predetermined motion, the renewable energy generator 1 of the present disclosure may use the main motors 124 and the auxiliary motor 16. The behavior of the renewable energy generator 1 using the main motors 124 and the auxiliary motor 16 will be described in detail below.

Figure 5:
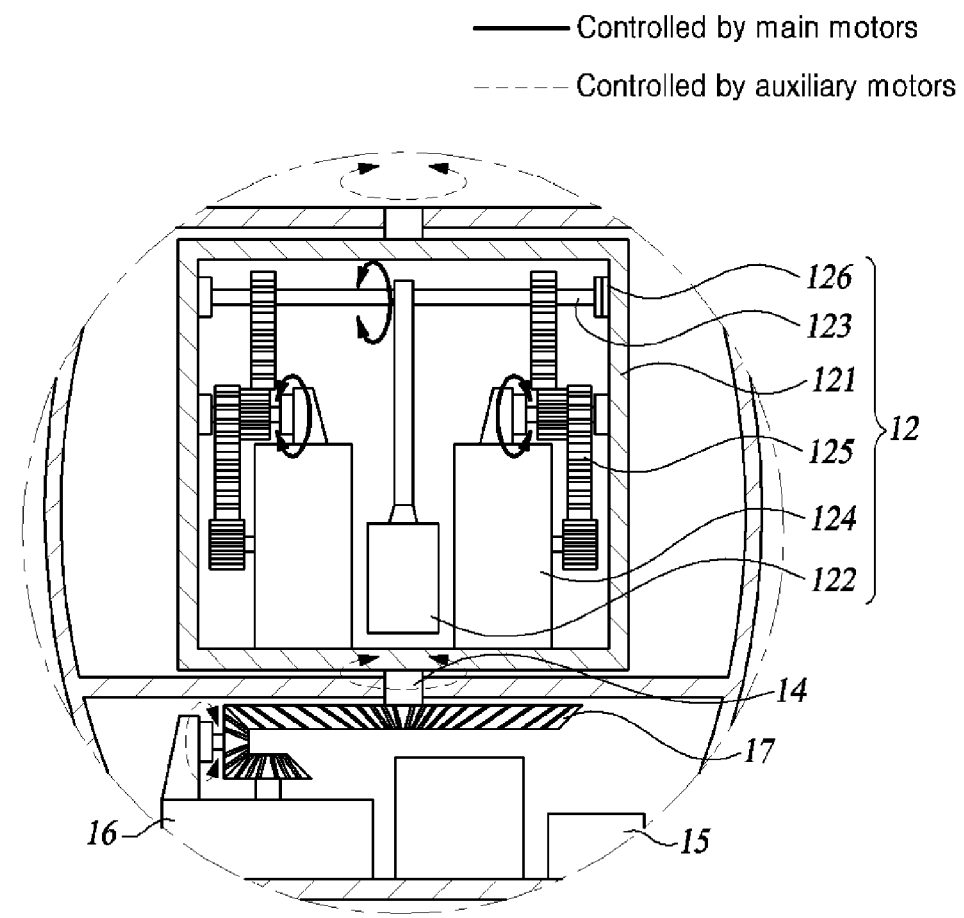
FIG. 5 is a view showing control targets of main motors and an auxiliary motor of a renewable energy generator according to at least one embodiment of the present disclosure.

FIG. 5 is a view showing control targets of the main motors 124 and the auxiliary motor 16 of the renewable energy generator 1 according to at least one embodiment of the present disclosure.

Figure 6:
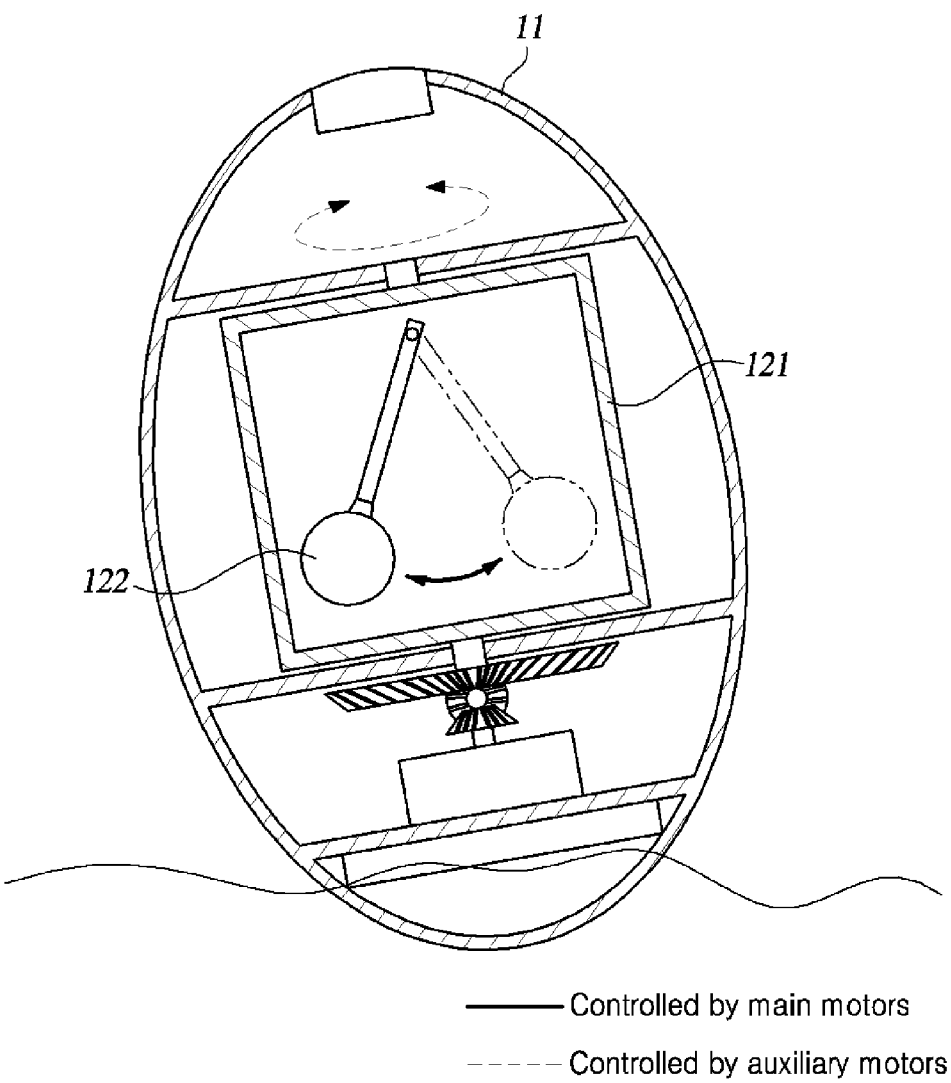
FIG. 6 is a view showing the behavior of a renewable energy generator according to at least one embodiment of the present disclosure.

FIG. 6 is a diagram showing the behavior of the renewable energy generator 1 according to at least one embodiment of the present disclosure.

As shown in FIGS. 5 and 6, the renewable energy generator 1 of the present disclosure may use the main motors 124 and the auxiliary motor 16 to arbitrarily adjust the tilt of the housing 11 or to generate a predetermined motion of the housing 11. The main motors 124 and the auxiliary motor 16 may be used as driving motors as well as power generating motors. When the controller 15 determines that it is necessary to arbitrarily adjust the tilt of the housing 11 or generate the predetermined motion of the housing 11, the controller 15 may switch the main motors 124 and the auxiliary motor 16 to a driving mode.

When the main motors 124 are driven, the gear units 125 rotate, and the pendulum rotation shaft 123 linked to the gear units 125 rotates to operate the pendulum 122 (as illustrated by solid lines). When the auxiliary motor 16 is driven, the auxiliary gear unit 17 rotates, which in turn rotates the main rotating shaft 14 fixed to the auxiliary gear unit 17 and thereby rotates the main generator unit 12 (dashed lines). Slight movements of the pendulum 122 and the main generator unit 12 may cause the renewable energy generator 1 to behave, resulting in an arbitrarily controlled tilt of the housing 11 and a predetermined motion thereof.

Figure 7:
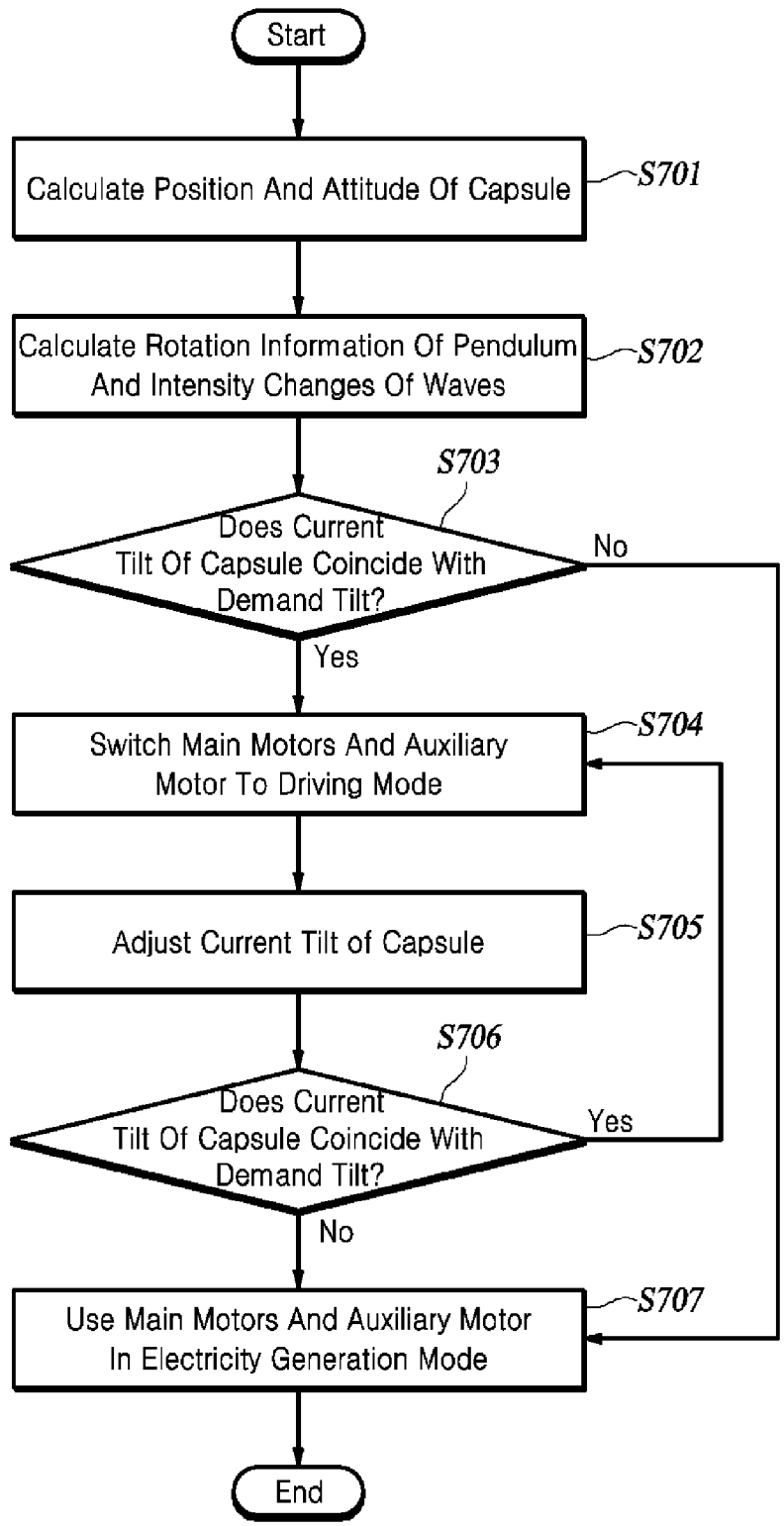
FIG. 7 is a flowchart of a method of generating renewable energy according to at least one embodiment of the present disclosure.

FIG. 7 is a flowchart of a method of generating renewable energy according to at least one embodiment of the present disclosure.

As shown in FIG. 7, the present disclosure can calculate the position and attitude of the renewable energy generator 1 by using the communication module 19 (S701). By using the UWB-based communication module 19, the present disclosure can calculate the absolute coordinates of the renewable energy generator 1 and calculate the tilted state and angle of the renewable energy generator 1.

The renewable energy generator 1 may calculate rotation information of the pendulum 122 by using the rotation angle sensor 126 and calculate the changes in the intensity of the waves by using the gyro sensor 127 (S702). The rotation angle sensor 126 may calculate the rotation information of the pendulum 122 by detecting the rotation angle and rotation speed of the pendulum rotation shaft 123. By using the gyro sensor 127, the present disclosure can calculate the intensity, frequency, speed, and pattern of the waves.

The controller 15 may use the UWB-based communication module 19, the rotation angle sensor 126, and the gyro sensor 127 to calculate the current tilt and demand tilt of the housing 11 of the renewable energy generator 1 and compare the current tilt with the demand tilt (S703). In this case, the demand tilt may be an inclination of the housing 11 when it is perpendicular to the sea level, or the demand tilt may be a predetermined angle that is not perpendicular. Further, the demand tilt may be continuously changed for the renewable energy generator 1 to perform a repeated behavior to generate a predetermined motion.

Upon determining that the current tilt does not coincide with the demand tilt, the controller 15 may switch the main motors 124 and the auxiliary motor 16 to the driving mode (S704). When the main motors 124 are driven, the gear units 125 rotate, which in turn rotates the pendulum rotation shaft 123 linked to the gear units 125 to operate the pendulum 122. When the auxiliary motor 16 is driven, the auxiliary gear unit 17 rotates, which in turn rotates the main rotating shaft 14 fixed to the auxiliary gear unit 17 to rotate the main generator unit 12. The slight movements of the pendulum 122 and the main generator unit 12 cause the renewable energy generator 1 to behave, resulting in an arbitrarily controlled tilt of the housing 11 and a predetermined motion thereof (S705).

The controller 15 may use the UWB-based communication module 19, the rotation angle sensor 126, and the gyro sensor 127 to calculate the current tilt of the housing 11 of the renewable energy generator 1 and compare the current tilt with the demand tilt to determine whether the two tilts coincide (S706). Upon determining that the tilt of the housing 11 needs no adjustment, the controller 15 may allow the main motors 124 and the auxiliary motor 16 to be used in the electricity generation mode (S707).

The aforementioned operations/functions may be embodied as computer readable code/algorithm/software stored on a non-transitory computer readable recording medium. The computer readable recording medium is any data storage device that can store data which can thereafter be read by a computer or a processor/microprocessor such as a processor included in the controller 15. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The controller 15 or the processor thereof may perform the above described operations/functions, by executing the computer readable code/algorithm/software stored on the non-transitory computer readable recording medium.

According to at least one embodiment, the renewable energy generator can perform highly efficiently with a pendulum operation and motors controlled by taking into account the intensity, speed, and frequency of the waves.

According to at least one embodiment of the present disclosure, the renewable energy generator can operate with increased efficiency by adjusting the tilt thereof.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A renewable energy generator, comprising:
   a housing configured to float in a body of water;
   a main generator comprising:
     an inner housing,
     a pendulum configured to move inside the inner housing,
     a pendulum rotation shaft vertically connected to the pendulum and fixed to the inner housing,
     a main motor configured to convert kinetic energy of the pendulum into electrical energy, and
     a gear linked to the pendulum rotation shaft and configured to transmit the kinetic energy of the pendulum to the main motor;
   one or more frames fixed internally of the housing at predetermined intervals;
   a main rotating shaft configured to link the main generator to be rotatable with respect to the one or more frames; and
   a controller configured to operate the pendulum by driving the main motor, and to control the main generator to cause the housing to behave due to an operation of the pendulum.

2. The renewable energy generator of claim 1, further comprising:
   an auxiliary gear located outside the main generator and linked to the main rotating shaft; and
   an auxiliary motor linked to the auxiliary gear.

3. The renewable energy generator of claim 2, wherein the controller is configured to drive the auxiliary motor to rotate the main rotating shaft.

4. The renewable energy generator of claim 2, wherein the controller is configured to drive the main motor and the auxiliary motor to cause the housing to have a required tilt or demand tilt.

5. The renewable energy generator of claim 4, wherein the demand tilt is determined to cause the main rotating shaft of the renewable energy generator to be oriented perpendicular to a sea level.

6. The renewable energy generator of claim 2, wherein the controller is configured to drive the main motor and the auxiliary motor to cause the housing to generate a predetermined motion.

7. The renewable energy generator of claim 1, wherein the housing is shaped as a roly-poly toy or capsule.

8. The renewable energy generator of claim 1, wherein the main generator further comprises:
   a rotation angle sensor configured to detect a rotation angle and a rotation speed of the pendulum rotation shaft.

9. A method of generating renewable energy, the method comprising:
   calculating a position and an attitude of a renewable energy generator, shaped as a self-righting roly-poly toy or capsule, the renewable energy generator configured to convert wave energy into electrical energy to produce electric power;
   determining whether or not a pendulum needs to operate internally of the renewable energy generator;
   upon determining that the pendulum needs to operate, converting a main motor and an auxiliary motor installed internally of the renewable energy generator to a driving mode; and
   adjusting a tilt of the renewable energy generator.

10. The method of claim 9, wherein the calculating of the position and the attitude of the renewable energy generator comprises:
    calculating positioning information of the renewable energy generator by using a communication module.

11. The method of claim 9, wherein the determining of whether or not the pendulum needs to operate comprises:
    calculating a current tilt and a required tilt or demand tilt of the renewable energy generator by using one or more of a communication module, a rotation angle sensor, and a gyro sensor; and
    comparing the current tilt with the demand tilt.

12. The method of claim 11, wherein the determining of whether or not the pendulum needs to operate comprises:
    determining that the pendulum needs to operate when the renewable energy generator has a tilt that is different from the demand tilt.

13. The method of claim 12, wherein the adjusting of the tilt of the renewable energy generator comprises:
    adjusting the tilt of the renewable energy generator toward the demand tilt.

14. The method of claim 13, wherein the adjusting of the tilt of the renewable energy generator toward the demand tilt comprises:
    controlling to render the renewable energy generator to be oriented perpendicular to a sea level.

15. The method of claim 9, wherein the adjusting of the tilt of the renewable energy generator comprises:
    utilizing movements of the pendulum to make the renewable energy generator behave.

16. The method of claim 9, wherein the adjusting of the tilt of the renewable energy generator comprises:
    making the renewable energy generator to perform a cyclic behavior for the renewable energy generator to generate a predetermined motion.

17. A renewable energy generator, comprising:
    a housing configured to float in a body of water;
    a main generator comprising:
       an inner housing,
       a pendulum rotation shaft mechanically coupled to the inner housing,
       a pendulum configured to swing around an axis of the pendulum rotation shaft to cause the pendulum rotation shaft to rotate,
       a main motor,
       a gear linked to the pendulum rotation shaft and configured to transmit rotation of the pendulum rotation shaft to the main motor to cause the main motor to generate electrical energy, and
    one or more frames fixed internally of the housing;
    a main rotating shaft configured to link the main generator to be rotatable with respect to the one or more frames; and
    a controller configured to control rotation of the main rotating shaft to cause the main generator to move, so as to adjust a tilt of the housing with respect to the water.

18. The renewable energy generator of claim 17, further comprising:
    an auxiliary gear located outside the main generator and linked to the main rotating shaft; and
    an auxiliary motor linked to the auxiliary gear.

19. The renewable energy generator of claim 18, wherein the controller is configured to drive the auxiliary motor to rotate the main rotating shaft.

20. The renewable energy generator of claim 18, wherein the controller is configured to drive the main motor and the auxiliary motor to cause the housing to have a required tilt or demand tilt with respect to the water.

* * * * *